(12) United States Patent
Tomioka et al.

(10) Patent No.: US 9,405,106 B2
(45) Date of Patent: Aug. 2, 2016

(54) IMAGING LENS AND IMAGING APPARATUS

(71) Applicant: FUJIFILM Corporation, Tokyo (JP)

(72) Inventors: Ukyo Tomioka, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 170 days.

(21) Appl. No.: 14/446,404

(22) Filed: Jul. 30, 2014

(65) Prior Publication Data

US 2014/0334011 A1 Nov. 13, 2014

Related U.S. Application Data

(63) Continuation of application No. PCT/JP2013/000572, filed on Feb. 1, 2013.

(30) Foreign Application Priority Data

Feb. 6, 2012 (JP) .................. 2012-023014

(51) Int. Cl.
| | |
|---|---|
| *G02B 13/00* | (2006.01) |
| *G02B 13/04* | (2006.01) |
| *G02B 13/06* | (2006.01) |
| *G02B 13/24* | (2006.01) |
| *G02B 15/16* | (2006.01) |
| *G02B 13/02* | (2006.01) |
| *G02B 15/173* | (2006.01) |

(52) U.S. Cl.
CPC ............ *G02B 15/16* (2013.01); *G02B 13/02* (2013.01); *G02B 15/173* (2013.01)

(58) Field of Classification Search
CPC ........ G02B 13/00; G02B 13/02; G02B 13/04; G02B 13/06; G02B 13/24

USPC .................. 359/745–748, 749–754
See application file for complete search history.

(56) References Cited

U.S. PATENT DOCUMENTS

| | | | |
|---|---|---|---|
| 3,877,795 A | 4/1975 | Yamashita | |
| 2002/0097502 A1 | 7/2002 | Nakazawa et al. | |
| 2014/0334020 A1* | 11/2014 | Ono .................. | G02B 9/12 359/740 |
| 2014/0340563 A1* | 11/2014 | Yamada ............ | G02B 9/64 348/345 |

FOREIGN PATENT DOCUMENTS

| | | |
|---|---|---|
| JP | 49-5621 | 1/1974 |
| JP | 57-158609 | 9/1982 |
| JP | 06-242370 | 9/1994 |
| JP | 09-49968 | 2/1997 |
| JP | 2002-107619 | 4/2002 |

OTHER PUBLICATIONS

International Search Report PCT/JP2013/000572 dated Apr. 23, 2013.

* cited by examiner

*Primary Examiner* — Scott J Sugarman
(74) *Attorney, Agent, or Firm* — Young & Thompson (57) ABSTRACT

An imaging lens includes: a first lens group having a positive refractive power which is fixed during focusing operations; a second lens group having a positive refractive power which moves during focusing operations; and a third lens group which is fixed during focusing operations. The first lens group includes a 1*a* lens group having a positive refractive power, an aperture stop, and a 1*b* lens group having a positive refractive power. The 1*a* lens group includes a positive lens, a negative meniscus lens, a negative meniscus lens, a positive meniscus lens, a negative lens, a positive lens, a negative lens, and a cemented lens formed by a positive lens and a negative lens.

10 Claims, 10 Drawing Sheets

EXAMPLE 1

FIG.1
EXAMPLE 1

FIG.2 EXAMPLE 2

FIG.3 EXAMPLE 3

IMAGING LENS AND IMAGING APPARATUS

CROSS REFERENCE TO RELATED APPLICATIONS

The present application is a Continuation of PCT International Application No. PCT/JP2013/000572 filed on Feb. 1, 2013, which claims priority under 35 USC §119(a) to Japanese Patent Application No. 2012-023014 filed on Feb. 6, 2012. Each of the above applications is hereby expressly incorporated by reference in its entirety, into the present application.

TECHNICAL FIELD

The present invention is related to an imaging lens and an imaging apparatus. More specifically, the present invention is related to an imaging lens for use in electronic cameras such as digital cameras, broadcast cameras, and cinematic cameras, as well as an imaging apparatus equipped with such an imaging lens.

BACKGROUND ART

A plurality of fast, high performance imaging lenses to be used in imaging apparatuses that employ imaging elements such as a CCD (Charge Coupled Device) or a CMOS (Complementary Metal Oxide Semiconductor) as recording media, such as video cameras and electronic still cameras, have been proposed in the past. Among such imaging lenses, the Gauss type of imaging lens is particularly well known, and several imaging lenses having F numbers from 1.2 to approximately 2.8 have been proposed.

For example, Japanese Unexamined Patent Publication No. 6(1994)-242370 proposes an imaging lens having an F number of 1.4. In addition, an imaging lens designed to reduce the weight of focusing lenses by adopting a rear focusing configuration is proposed in Japanese Unexamined Patent Publication No. 9(1997)-049968.

DISCLOSURE OF THE INVENTION

It is required for high performance to be achieved up to a state in which an aperture is completely open, particularly in cinematic imaging lenses. The F number of the imaging lens of Japanese Unexamined Patent Publication No. 6(1994)-242370 is 1.4, which is fast. However, sagittal comatic flare remains in a state in which the aperture is completely open. In addition, focusing is performed by feeding out the entire system. Therefore, there is a drawback that the weight of focusing lens groups is heavy.

In addition, the imaging lens of Japanese Unexamined Patent Publication No. 9(1997)-049968 performs focusing operations using a single cemented lens, and therefore is lightweight. However, there is a drawback that the F number is 2.8, which is slow.

The present invention has been developed in view of the foregoing circumstances. It is an object of the present invention to provide an imaging lens in which the weight of a focusing group is reduced while also realizing a small F number and high performance. It is another object of the present invention to provide an imaging apparatus equipped with such an imaging lens.

An imaging lens of the present invention substantially consists of:

a first lens group having a positive refractive power which is fixed during focusing operations;

a second lens group having a positive refractive power which moves during focusing operations; and a third lens group which is fixed during focusing operations, provided in this order from an object side;

the first lens group substantially consisting of a 1$a$ lens group having a positive refractive power, a stop, and a 1$b$ lens group having a positive refractive power, provided in this order from the object side;

the 1$a$ lens group substantially consisting of a positive lens 1$a$1 with a convex surface having a radius of curvature with a small absolute value toward the object side, a negative meniscus lens 1$a$2 with a convex surface toward the object side, a negative meniscus lens 1$a$3 with a convex surface toward the object side, a positive meniscus lens 1$a$4 with a convex surface toward the object side, a negative lens 1$a$5 with a concave surface having a radius of curvature with a small absolute value toward an image side, a positive lens 1$a$6, a negative lens 1$a$7, and a cemented lens formed by a positive lens 1$a$8 and a negative lens 1$a$9, provided in this order from the object side.

It is preferable for the imaging lens of the present invention to satisfy the following conditional formula.

$$0.20 < f/f2 < 0.50 \quad (1)$$

wherein f is the focal length of the entire system when focused on an object at an infinite distance and f2 is the focal length of the second lens group.

In this case, it is more preferable for the following conditional formula to be satisfied.

$$0.25 < f/f2 < 0.40 \quad (1)'$$

In addition, it is preferable for the second lens group to substantially consist of by a positive lens with a convex surface having a radius of curvature with a small absolute value toward the object side.

In addition, it is preferable for the 1$b$ lens group to substantially consist of a cemented lens formed by a positive lens 1$b$1 and a negative lens 1$b$2.

In addition, it is preferable for the third lens group to substantially consist of a negative lens 31 with a surface having a radius of curvature with a small absolute value toward the image side, and a positive lens 32 with a surface having a radius of curvature with a small absolute value toward the object side, provided in this order from the object side.

In addition, it is preferable for the following conditional formulae to be satisfied.

$$80 < v1a8 \quad (2)$$

$$40 < v1a9 < 60 \quad (3)$$

wherein v1$a$8 is the Abbe's number of the positive lens 1$a$8, and v1$a$9 is the Abbe's number of the negative lens 1$a$9.

In addition, it is preferable for the following conditional formula to be satisfied.

$$0.20 < D/f < 0.60 \quad (4)$$

wherein D is the distance between the stop and the 1$b$ lens group, and f is the focal length of the entire system when focused on an object at an infinite distance.

In this case, it is more preferable for the following conditional formula to be satisfied.

$$0.30 < D/f < 0.50 \quad (4)'$$

An imaging apparatus of the present invention is characterised by being equipped with the imaging lens of the present invention described above.

The imaging lens of the present invention substantially consists of: the first lens group having a positive refractive power which is fixed during focusing operations; the second lens group having a positive refractive power which moves during focusing operations; and the third lens group which is fixed during focusing operations, provided in this order from an object side. The first lens group substantially consists of the 1a lens group having a positive refractive power, the stop, and the 1b lens group having a positive refractive power, provided in this order from the object side. The 1a lens group substantially consists of the positive lens 1a1 with a convex surface having a radius of curvature with a small absolute value toward the object side, the negative meniscus lens 1a2 with a convex surface toward the object side, the negative meniscus lens 1a3 with a convex surface toward the object side, the positive meniscus lens 1a4 with a convex surface toward the object side, the negative lens 1a5 with a concave surface having a radius of curvature with a small absolute value toward an image side, the positive lens 1a6, the negative lens 1a7, and the cemented lens formed by the positive lens 1a8 and the negative lens 1a9, provided in this order from the object side. Therefore, a high performance imaging lens with a small F number can be realized, in which the weight of a focusing lens group (the second lens group) is reduced.

The imaging apparatus of the present invention is equipped with the imaging lens of the present invention. Therefore, focusing operations can be performed at high speed, and further, bright videos having high image quality can be obtained.

Figure 1:
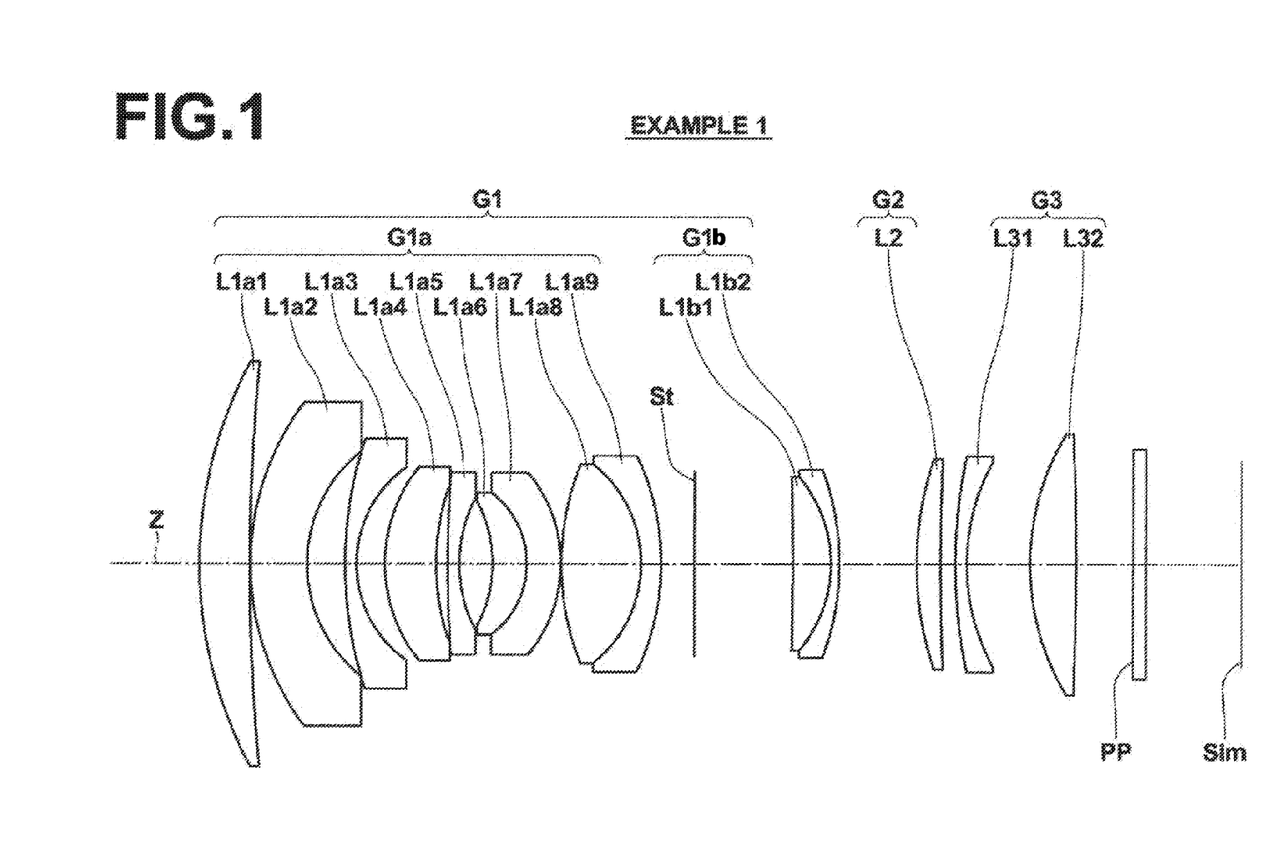
FIG. 1 is a sectional diagram that illustrates the lens configuration of an imaging lens according to an embodiment of the present invention (which is common with Example 1).

Hereinafter, embodiments of the present invention will be described in detail with reference to the attached drawings. FIG. 1 is a sectional diagram that illustrates the configuration of an imaging lens according to an embodiment of the present invention (which is common with that of Example 1). The example of the configuration illustrated in FIG. 1 is the same as the configuration of an imaging lens of Example 1 to be described later. In FIG. 1, the left side is the object side and the right side is the image side.

This imaging lens is constituted by a first lens group G1 having a positive refractive power which is fixed during focusing operations and includes an aperture stop St, a second lens group G2 having a positive refractive power that moves during focusing operations, and a third lens group G3 which is fixed during focusing operations, provided along an optical axis Z in this order from the object side. Note that the aperture stop St illustrated in FIG. 1 does not necessarily represent the size or the shape thereof, but the position thereof on the optical axis Z.

By configuring the first lens group G1 to have a positive refractive power in this manner, the heights of axial marginal rays of light that enter the second lens group G2 can be suppressed. Therefore, the diameter of the focusing lens group (the second lens group G2) can be kept small, and a reduction in weight becomes possible.

When this imaging lens is applied to an imaging apparatus, it is preferable for a cover glass for protecting the imaging surface of the imaging element and various filters, such as a low pass filter and an infrared cutoff filter to be provided between the optical system and an imaging surface Sim, according to the configuration of the camera on which the lens is mounted. FIG. 1 illustrates an example in which an plane parallel optical member PP is provided assuming the presence of the cover glass, the various types of filters, and the like between the third lens group G3 and the imaging surface Sim.

The first lens group G1 is constituted by a 1a lens group G1a having a positive refractive power, the aperture stop St, and a 1b lens group G1b having a positive refractive power, provided in this order from the object side. By providing a lens group having a positive refractive power behind the aperture stop St in this manner, the angles of inclination of chief rays of light that enter the second lens group G2 become small. Therefore, variations in the angle of view due to focusing operations can be suppressed.

In addition, the 1a lens group G1a is constituted by a positive lens L1a1 with a convex surface having a radius of curvature with a small absolute value toward the object side, a negative meniscus lens L1a2 with a convex surface toward, the object side, a negative meniscus lens L1a3 with a convex surface toward the object side, a positive meniscus lens L1a4 with a convex surface toward the object side, a negative lens L1a5 with a concave surface having a radius of curvature with a small absolute value toward an image side, a positive lens L1a6, a negative lens L1a7, and a cemented lens formed by a positive lens L1a8 and a negative lens L1a9. By adopting such a configuration, spherical aberration, comatic aberration, and astigmatism can be suppressed.

In addition, the 1b lens group G1b is constituted by a cemented lens formed by a positive lens L1b1 and a negative lens L1b2. By adopting this configuration, longitudinal chromatic aberration and lateral chromatic aberration can be corrected.

In addition, the second lens group G2 is constituted by a positive lens L2 with a convex surface with a radius of curvature with a small absolute value toward the object side. By adopting this configuration, variations in spherical aberration during focusing operations can be suppressed. In addition, because focusing operations are performed by a single lens, the focusing lens group is lightweight.

In addition, the third lens group G3 is constituted by a negative lens L31 with a surface having a radius of curvature with a small absolute value toward the image side, and a positive lens L32 with a surface having a radius of curvature with a small absolute value toward the object side, provided in this order from the object side.

In addition, the imaging lens according to the embodiment of the present invention is configured to satisfy Conditional Formula (1) below. Note that the imaging lens can have higher performance by satisfying Conditional Formula (1)' below.

$$0.20 < f/f2 < 0.50 \quad (1)$$

$$0.25 < f/f2 < 0.40 \quad (1)'$$

wherein f is the focal length of the entire system when focused on an object at an infinite distance and f2 is the focal length of the second lens group.

If the value of f/f2 is less than the lower limit defined in Conditional Formula (1), the amount of movement of the focusing lens group during focusing operations will become excessively great. If the value of f/f2 is greater than the upper limit defined in Conditional Formula (1), variations in spherical aberration caused by focusing operations will become great.

In addition, the imaging lens of the embodiment of the present invention is configured to satisfy Conditional Formulae (2) and (3) below.

$$80 < v1a8 \quad (2)$$

$$40 < v1a9 < 60 \quad (3)$$

wherein v1a8 is the Abbe's number of the positive lens 1a8, and v1a9 is the Abbe's number of the negative lens 1a9.

If the value of v1a8 is less than the lower limit defined in Conditional Formula (2), correction of longitudinal chromatic aberration will become difficult. In addition, if the value of v1a9 is less than the lower limit defined in Conditional Formula (3), correction of second order chromatic aberration will become difficult, and if the value of v1a9 is greater than the upper limit defined in Conditional Formula (3), correction of longitudinal chromatic aberration will become difficult.

In addition, the imaging lens of the embodiment of the present invention is configured to satisfy Conditional Formula (4) below. Note that the imaging lens can have higher performance by satisfying Conditional Formula (4)' below.

$$0.20 < D/f < 0.60 \quad (4)$$

$$0.30 < D/f < 0.50 \quad (4)'$$

wherein D is the distance between the aperture stop and the 1b lens group, and f is the focal length of the entire system when focused on an object at an infinite distance.

If the value of D/f is less than the lower limit defined in Conditional Formula (4), the angles of inclination of chief rays of light that enter the second lens group G2 will become large, resulting in an increase in variations of the angle of view due to focusing operations. In addition, if the value of D/f is greater than the upper limit defined in Conditional Formula (4), the heights of chief rays of light that enter the second lens group G2 will become large, also resulting in an increase in variations of the angle of view due to focusing operations.

It is preferable for glass to be employed as the material placed most toward the object side. Alternatively, a transparent ceramic may be employed.

In addition, in the case that the present wide angle lens is used in an environment in which the lens is likely to become damaged, if is preferable for a protective multilayer film coating to be administered. Further, an antireflective coating film may also be administered in order to reduce ghost light during use.

In addition, the example illustrated in FIG. 1 has been described as an example in which the optical member PP is provided between the lens system and the imaging surface Sim. Alternatively, various filters, such as a low pass filter and filters that cut off specific wavelength ranges, may be provided among each of the lenses. As a further alternative, coatings that have the same functions as the various filters may be administered on the surfaces of the lenses.

Next, numerical examples of the wide angle lens of the present invention will be described. Note that the numerical values shown in Tables 1 through 7 below and the aberration diagrams of FIGS. 4 through 9 are those which are standardized such that the focal length f of the entire lens system in a state focused on infinity is 1.

Figure 2:
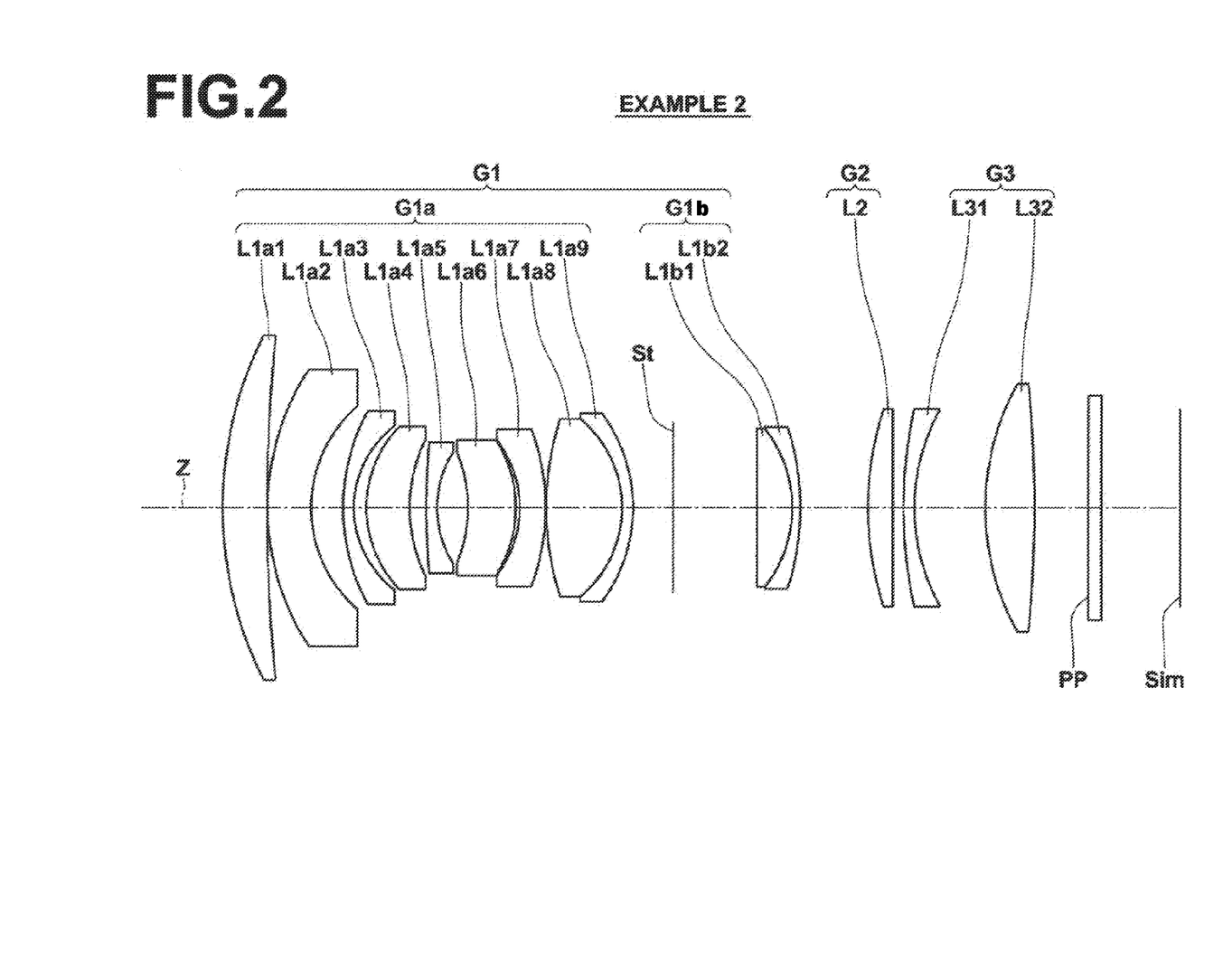
FIG. 2 is a sectional diagram that illustrates the lens configuration of an imaging lens according to Example 2 of the present invention.
Figure 3:
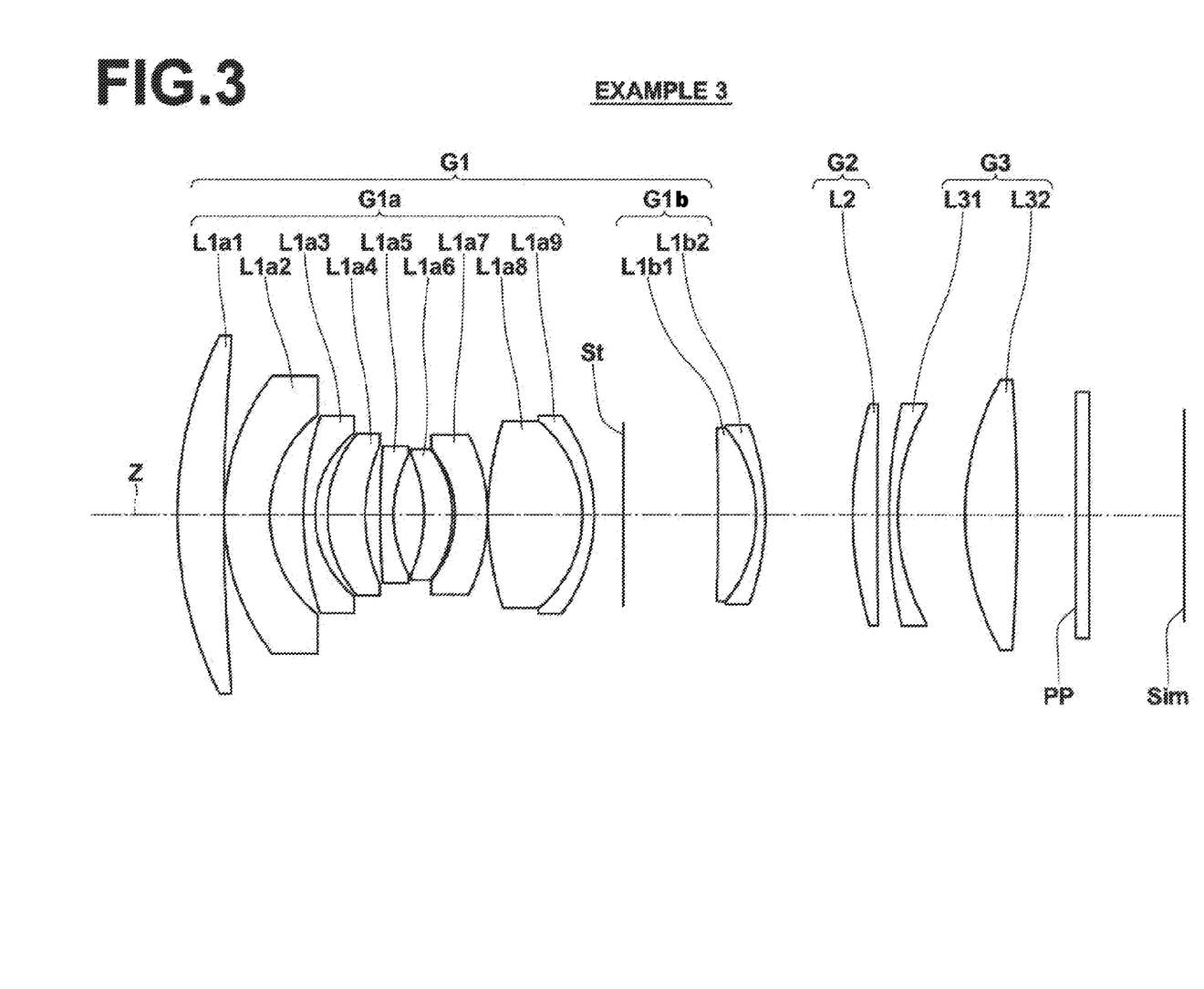
FIG. 3 is a sectional diagram that illustrates the lens configuration of an imaging lens according to Example 3 of the present invention.

FIG. 1 is a sectional diagram that illustrates the lens configuration of the zoom lens of Example 1. FIG. 2 is a sectional diagram that illustrates the lens configuration of the zoom lens of Example 2. FIG. 3 is a sectional diagram that illustrates the lens configuration of the zoom lens of Example 3. Note that in FIG. 1 through FIG. 3, the optical member PP is also illustrated, the left side is the object side, the right side is the image side, and the aperture stop St in the drawings do not necessarily represent the size or the shape thereof, but the position thereof along the optical axis Z.

Basic lens data of the imaging lens of Example 1 are shown in Table 1, and data related to various items are shown in Table 2. In addition, basic lens data of the imaging lens of Example 2 are shown in Table 3, and data related to various items are shown in Table 4. Further, basic lens data of the imaging lens of Example 3 are shown in Table 5, and data related to various items are shown in Table 6.

Hereinafter, the meanings of the symbols in the tables will be described for those of Example 1 as an example. The meanings of the symbols are basically the same for those of Examples 2 and 3.

In the lens data of Table 1, ith (i=1, 2, 3, ...) lens surface numbers that sequentially increase from the object side to the image side, with the lens surface at the most object side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, ...) optical elements that sequentially increase from the object side to the image side, with the optical element at the most object side designated as first, with respect to the d line (wavelength: 587.6 nm) are shown in the column Ndj. The Abbe's numbers of the jth optical element with respect to the d line are shown in the column vdj.

Note that the signs of the radii of curvature are positive in cases that the surface shape is convex toward the object side, and negative in cases that the surface shape is convex toward the image side. The aperture stop St, the optical member PP, and the imaging surface are also included in the basic lens data. Text reading "(stop)" is indicated along with a surface number in the column of the surface numbers at the surface corresponding to the aperture stop. Similarly, text reading "imaging surface" is indicated along with a surface number in the column of the surface numbers at the surface corresponding to the imaging surface.

The values of the focal length f', the F number FNo., and the full angle of view 2ω are shown as data related to various items in Table 2.

Degrees are used as units of angles in the basic lens data and the data related to various items. However, the other values are normalized, and therefore no units are employed.

TABLE 1

Example 1: Lens Data (N, ν related to the d line)

| Si (Surface Number) | Ri (Radius of Curvature) | Di (Distance) | Ndi (Refractive Index) | νdj (Abbe's Number) |
|---|---|---|---|---|
| 1 | 1.784940 | 0.21135 | 1.72916 | 54.68 |
| 2 | 9.115908 | 0.00238 | | |
| 3 | 1.132970 | 0.23805 | 1.80610 | 33.27 |
| 4 | 0.604269 | 0.15954 | | |
| 5 | 1.681453 | 0.04760 | 1.48749 | 70.23 |
| 6 | 0.496523 | 0.11903 | | |
| 7 | 0.647244 | 0.21424 | 1.76182 | 26.52 |
| 8 | 1.004037 | 0.04835 | | |
| 9 | 5.365038 | 0.04760 | 1.48749 | 70.23 |
| 10 | 0.581188 | 0.13951 | | |
| 11 | −0.552693 | 0.14307 | 1.49700 | 81.54 |
| 12 | −0.371302 | 0.14283 | 1.83400 | 37.16 |
| 13 | −0.595704 | 0.00238 | | |
| 14 | 1.118642 | 0.33351 | 1.49700 | 81.54 |
| 15 | −0.532675 | 0.08451 | 1.51823 | 58.90 |
| 16 | −1.046698 | 0.13657 | | |
| 17 (stop) | ∞ | 0.41156 | | |
| 18 | −12.372350 | 0.15933 | 1.49700 | 81.54 |
| 19 | −0.560183 | 0.03570 | 1.79952 | 42.22 |
| 20 | −1.118128 | 0.32351 | | |
| 21 | 1.388605 | 0.10107 | 1.49700 | 81.54 |
| 22 | 11.860127 | 0.06097 | | |
| 23 | 2.218952 | 0.04761 | 1.80400 | 46.58 |
| 24 | 0.898894 | 0.26511 | | |
| 25 | 1.058433 | 0.19400 | 1.72916 | 54.68 |
| 26 | −12.910190 | 0.23805 | | |
| 27 | ∞ | 0.05475 | 1.51633 | 64.14 |
| 28 | ∞ | 0.40157 | | |
| 29 (imaging surface) | ∞ | | | |

TABLE 2

Example 1: Items (related to the d line)

| | |
|---|---|
| f | 1.00 |
| FNo. | 1.90 |
| 2ω[°] | 46.8 |

TABLE 3

Example 2: Lens Data (N, ν related to the d line)

| Si (Surface Number) | Ri (Radius of Curvature) | Di (Distance) | Ndi (Refractive Index) | νdj (Abbe's Number) |
|---|---|---|---|---|
| 1 | 1.672970 | 0.19546 | 1.72916 | 54.68 |
| 2 | 7.653443 | 0.00238 | | |
| 3 | 1.105497 | 0.19045 | 1.80001 | 25.88 |
| 4 | 0.585996 | 0.14025 | | |
| 5 | 0.871627 | 0.04761 | 1.52910 | 75.52 |
| 6 | 0.448361 | 0.05483 | | |
| 7 | 0.508067 | 0.19045 | 1.79999 | 25.00 |
| 8 | 0.682492 | 0.07251 | | |
| 9 | 3.216995 | 0.04761 | 1.47999 | 82.14 |
| 10 | 0.463854 | 0.13442 | | |
| 11 | −0.637649 | 0.20990 | 1.80001 | 48.00 |
| 12 | −0.551174 | 0.01695 | | |
| 13 | −0.485594 | 0.11359 | 1.61266 | 36.73 |
| 14 | −0.977088 | 0.00238 | | |
| 15 | 1.252631 | 0.33352 | 1.49700 | 81.54 |
| 16 | −0.501355 | 0.04761 | 1.75001 | 44.35 |
| 17 | −0.687163 | 0.17316 | | |
| 18 (stop) | ∞ | 0.36651 | | |
| 19 | −66.061965 | 0.15518 | 1.49700 | 81.54 |
| 20 | −0.558760 | 0.03570 | 1.80400 | 46.58 |
| 21 | −1.134912 | 0.29605 | | |
| 22 | 1.383731 | 0.10962 | 1.49700 | 81.54 |
| 23 | 406.379062 | 0.04638 | | |
| 24 | 2.012916 | 0.04761 | 1.85001 | 37.30 |
| 25 | 0.876393 | 0.31139 | | |
| 26 | 1.114441 | 0.21602 | 1.69931 | 46.97 |
| 27 | −5.467531 | 0.23806 | | |
| 28 | ∞ | 0.05475 | 1.51633 | 64.14 |
| 29 | ∞ | 0.34727 | | |
| 30 (imaging surface) | ∞ | | | |

TABLE 4

Example 2: Items (related to the d line)

| | |
|---|---|
| f | 1.00 |
| FNo. | 1.90 |
| 2ω[°] | 46.6 |

TABLE 5

Example 3: Lens Data (N, ν related to the d line)

| Si (Surface Number) | Ri (Radius of Curvature) | Di (Distance) | Ndi (Refractive Index) | νdj (Abbe's Number) |
|---|---|---|---|---|
| 1 | 1.606922 | 0.18842 | 1.72916 | 54.68 |
| 2 | 8.157619 | 0.00239 | | |
| 3 | 0.909670 | 0.18353 | 1.72450 | 28.78 |
| 4 | 0.519612 | 0.13567 | | |
| 5 | 1.181706 | 0.04761 | 1.48001 | 83.08 |
| 6 | 0.421895 | 0.04995 | | |
| 7 | 0.506160 | 0.15160 | 1.80000 | 25.00 |
| 8 | 0.679785 | 0.06204 | | |
| 9 | 4.061691 | 0.05309 | 1.48000 | 83.08 |
| 10 | 0.507099 | 0.12176 | | |
| 11 | −0.582935 | 0.11466 | 1.70251 | 54.92 |
| 12 | −0.435007 | 0.01191 | | |
| 13 | −0.406533 | 0.12964 | 1.83000 | 34.14 |
| 14 | −0.720882 | 0.00238 | | |
| 15 | 1.196528 | 0.38108 | 1.49700 | 81.54 |
| 16 | −0.493049 | 0.04761 | 1.73839 | 42.49 |
| 17 | −0.675628 | 0.11901 | | |
| 18 (stop) | ∞ | 0.37775 | | |
| 19 | −14.814242 | 0.15512 | 1.49700 | 81.54 |
| 20 | −0.555557 | 0.03571 | 1.82999 | 45.00 |
| 21 | −1.022284 | 0.35361 | | |
| 22 | 1.497050 | 0.09801 | 1.49700 | 81.54 |
| 23 | 19.332403 | 0.04802 | | |
| 24 | 1.942221 | 0.03570 | 1.84999 | 43.00 |
| 25 | 0.893047 | 0.27221 | | |
| 26 | 1.114884 | 0.21033 | 1.74277 | 47.94 |
| 27 | −8.073153 | 0.23802 | | |
| 28 | ∞ | 0.05475 | 1.51633 | 64.14 |
| 29 | ∞ | 0.38402 | | |
| 30 (imaging) | ∞ | | | |

TABLE 6

Example 3: Items (related to the d line)

| | |
|---|---|
| f | 1.00 |
| FNo. | 1.90 |
| 2ω[°] | 46.4 |

Table 7 shows values of the imaging lenses of Examples 1 through 3 corresponding to Conditional Formulae (1) through (4). Note that all of the Examples use the d line as a reference wavelength, and the values shown in Table 7 below are those for the reference wavelength.

TABLE 7

| Formula No. | Expression | Example 1 | Example 2 | Example 3 |
|---|---|---|---|---|
| (1) | f/f2 | 0.31702 | 0.35798 | 0.30684 |
| (2) | ν1a8 | 81.54 | 81.54 | 81.54 |
| (3) | ν1a9 | 58.90 | 44.35 | 42.49 |
| (4) | D/f | 0.4116 | 0.3666 | 0.3778 |

Figure 4:
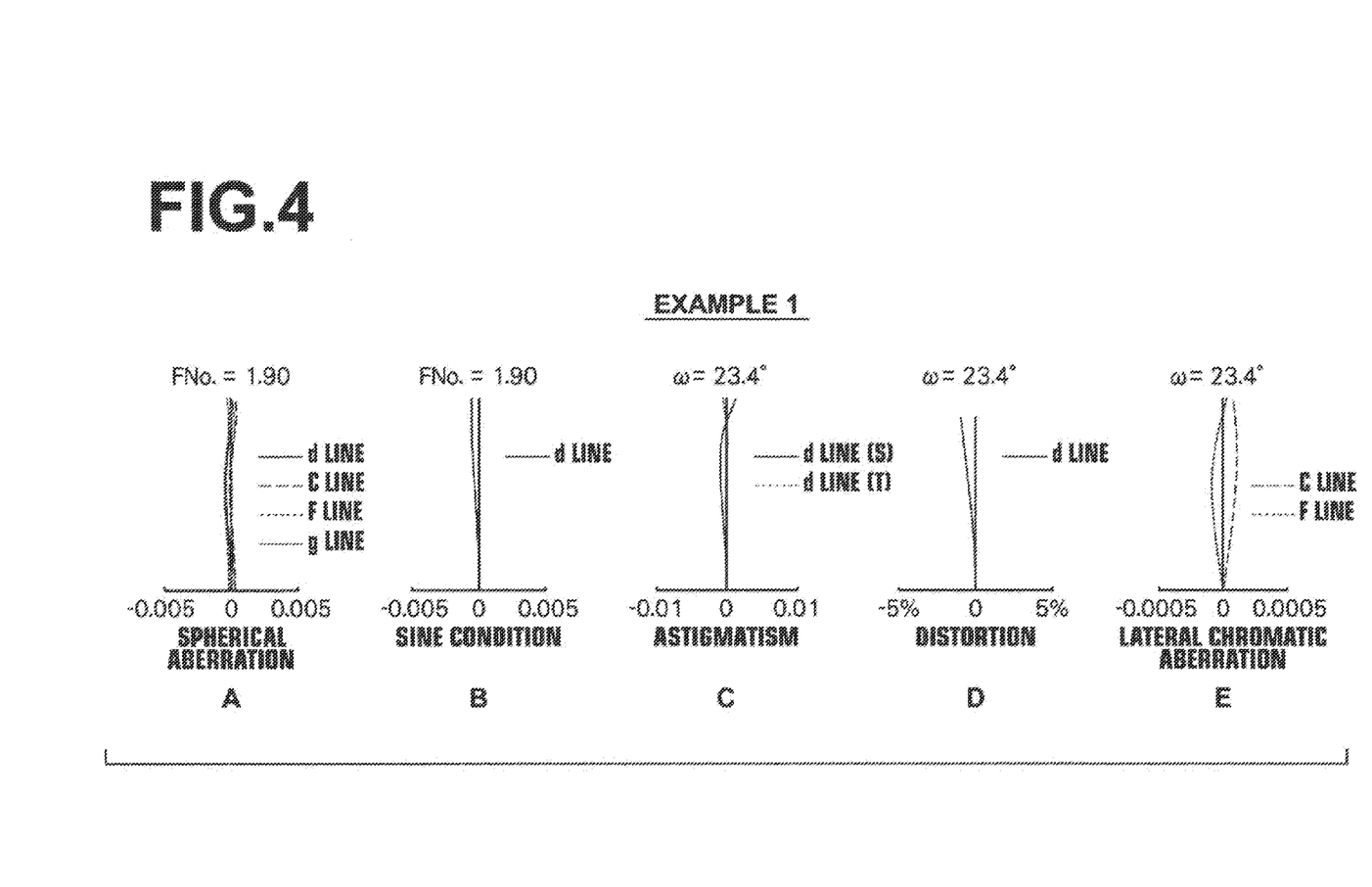
FIG. 4 is a collection of diagrams (A through E) that illustrate aberrations of the imaging lens of Example 1.

A through E of FIG. 4 are diagrams that illustrate various aberrations of the imaging lens of Example 1. A through E of FIG. 4 respectively illustrate spherical aberration, offense against the sine condition, astigmatism, distortion, and lateral chromatic aberration.

The aberration diagrams that illustrate spherical aberration, astigmatism, and distortion show aberrations related to the d line (wavelength: 587.6 nm). The diagrams that illustrate spherical aberration and lateral chromatic aberration show aberrations related to the d line (wavelength: 587.6 nm), the C line (wavelength: 656.3 nm), the F line (wavelength: 486.1 nm) and the g line (wavelength: 435.8 nm) with a solid line, a long broken line, a short broken line, and a gray line, respectively. In the diagram that illustrate astigmatism, aberrations in the sagittal direction and in the tangential direction are shown with a solid line and a broken line, respectively. In the diagram that illustrates spherical aberration, "F No." Denotes the F number, and in the other diagrams, ω denotes the half angle of view.

Figure 5:
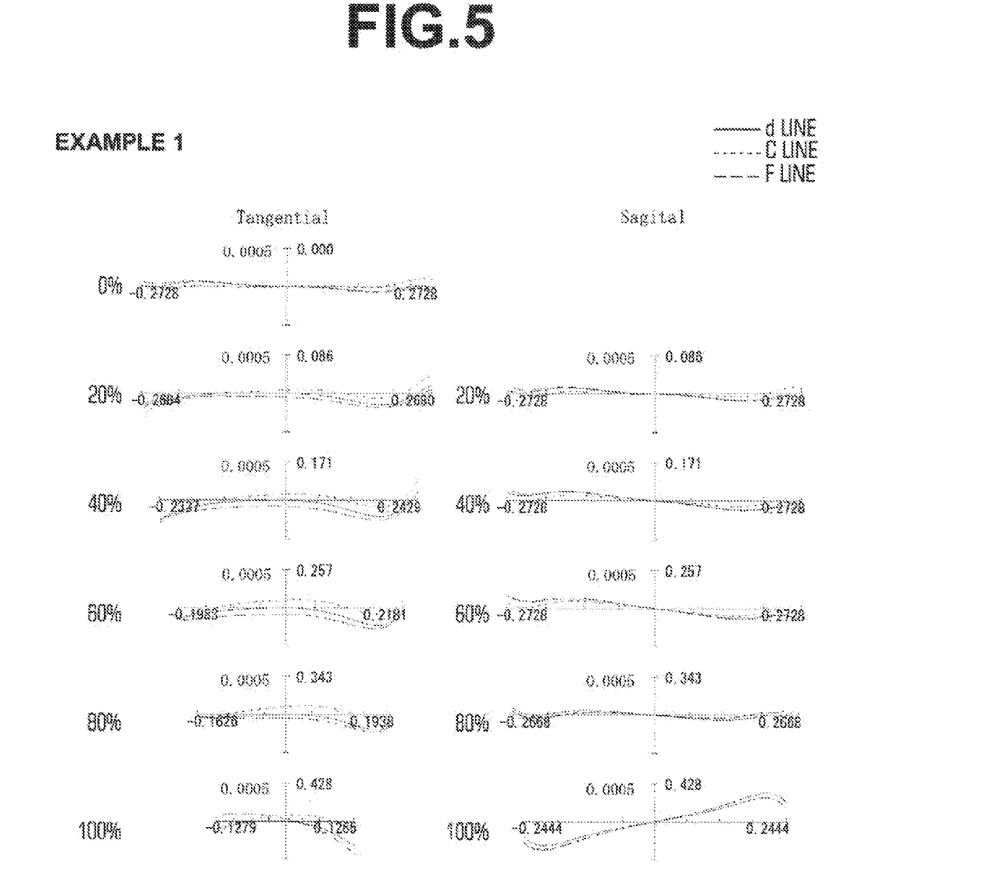
FIG. 5 is a collection of diagrams that illustrate lateral aberrations of the imaging lens of Example 1.

In addition, lateral aberration diagrams of the imaging lens of Example 1 are shown in FIG. 5.

The diagrams that illustrate lateral aberration show aberrations related to the d line (wavelength: 587.6 nm), the C line (wavelength: 656.3 nm), and the F line (wavelength: 486.1 nm) with solid lines, short broken lines, and long broken lines, respectively.

Figure 6:
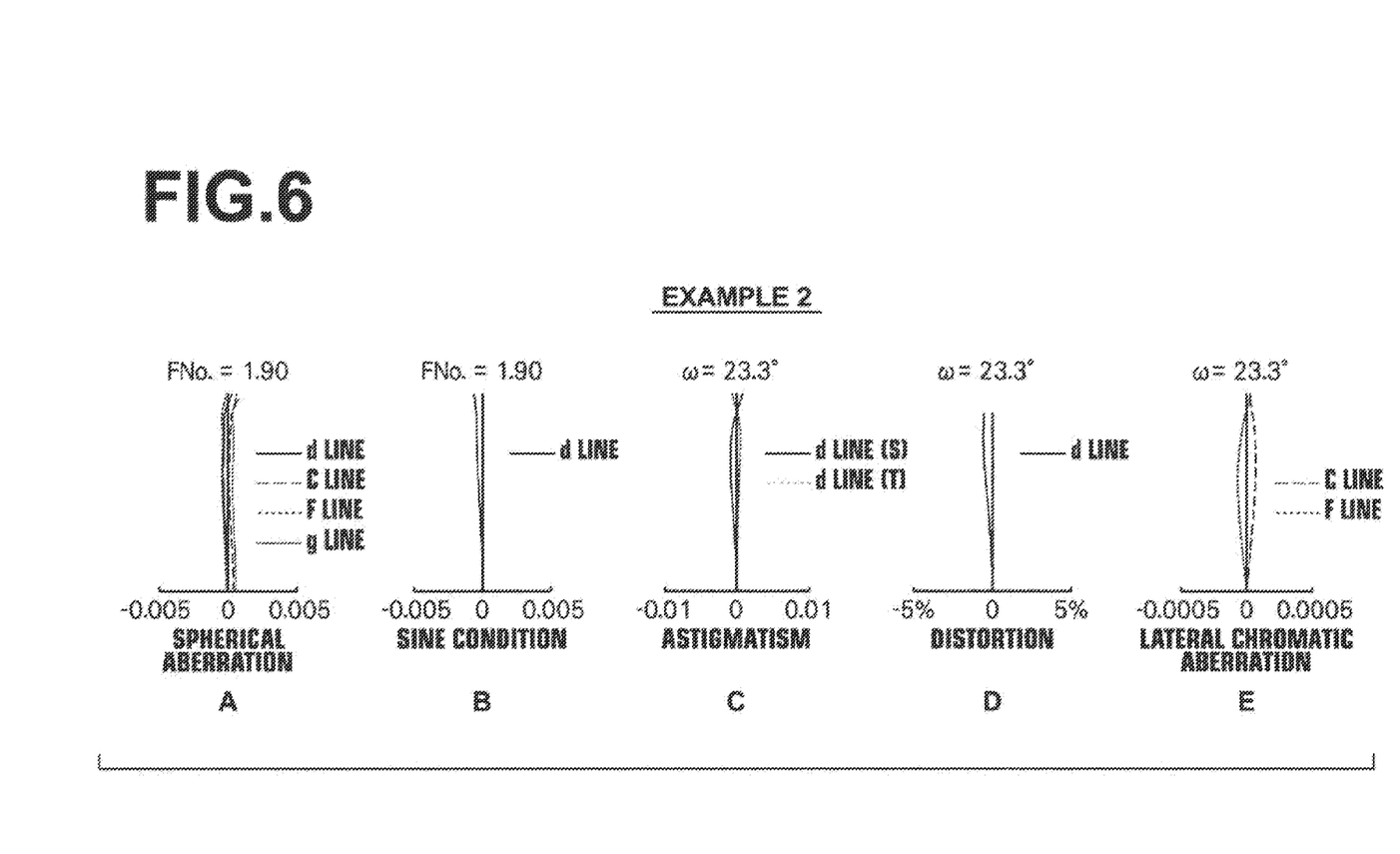
FIG. 6 is a collection of diagrams (A through E) that illustrate aberrations of the imaging lens of Example 2.
Figure 7:
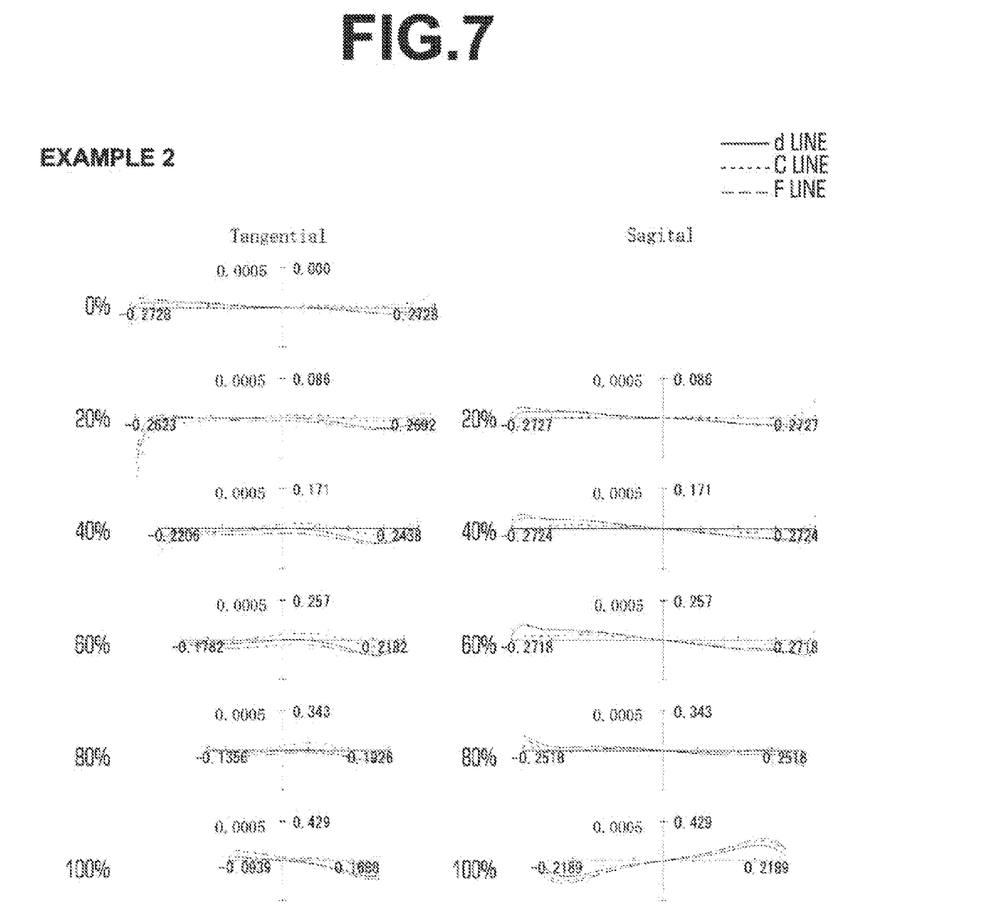
FIG. 7 is a collection of diagrams that illustrate lateral aberrations of the imaging lens of Example 2.

Similarly, various aberrations of the imaging lens of Example 2 are shown in A through E of FIG. 6, and lateral aberrations of the imaging lens of Example 2 are shown in FIG. 7.

Figure 8:
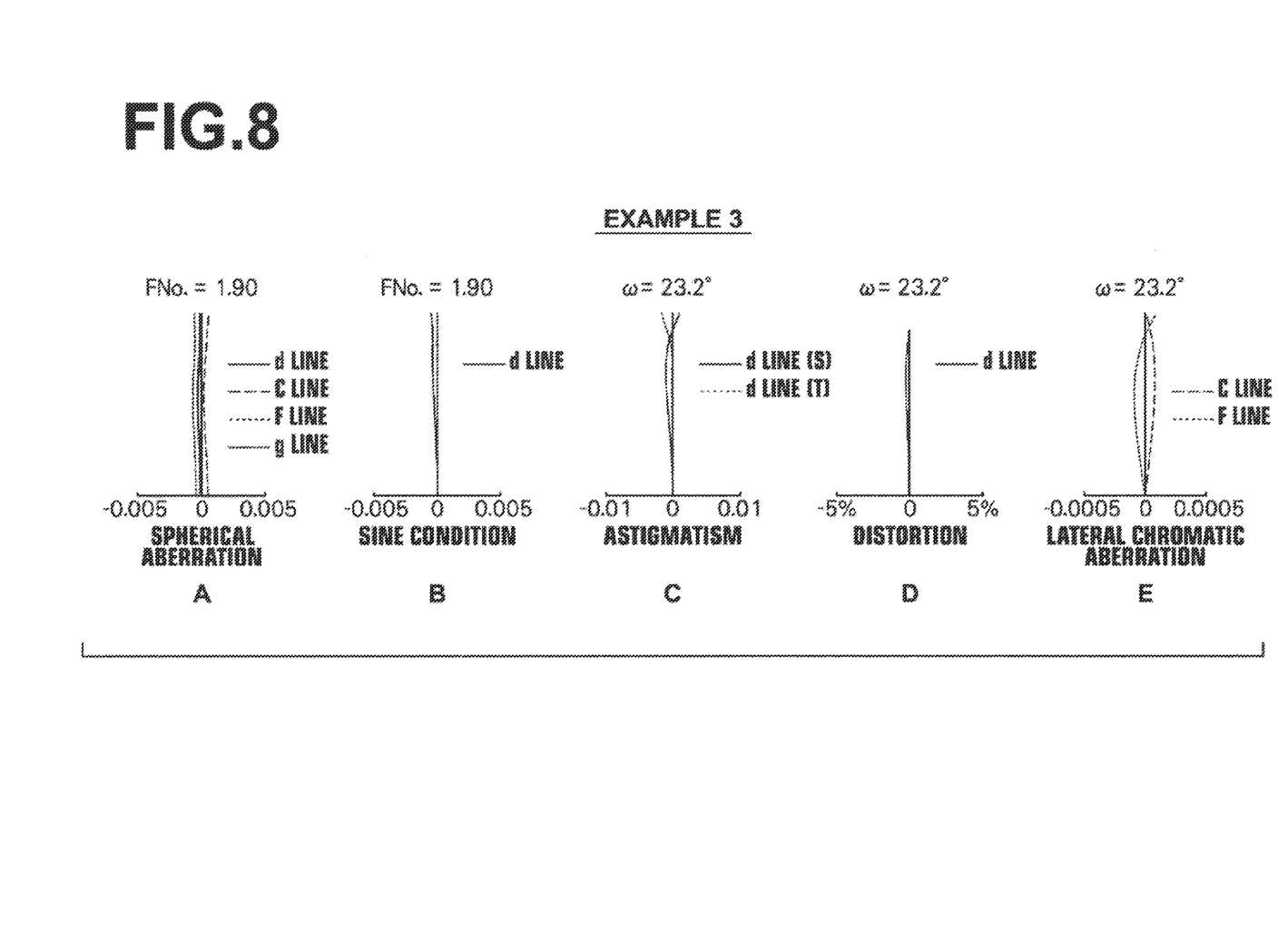
FIG. 8 is a collection of diagrams (A through E) that illustrate aberrations of the imaging lens of Example 3.
Figure 9:
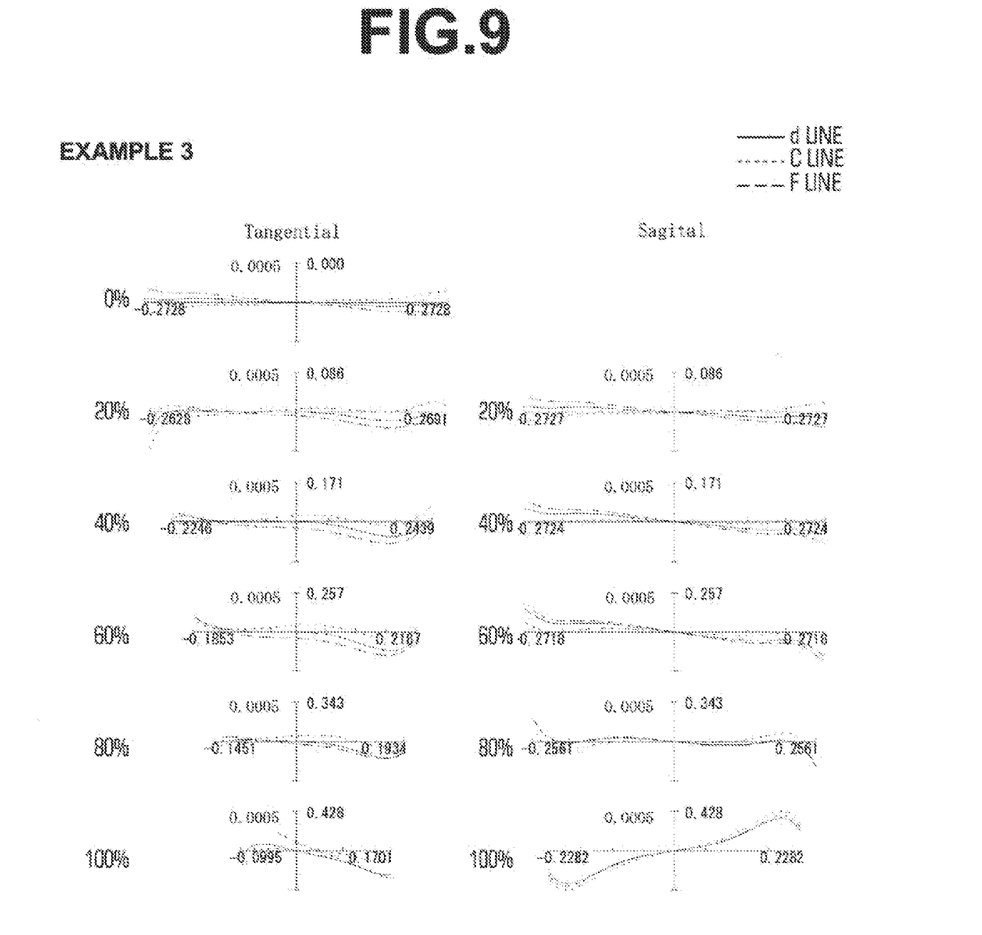
FIG. 9 is a collection of diagrams that illustrate lateral aberrations of the imaging lens of Example 3.

In addition, various aberrations of the imaging lens of Example 3 are shown in A through E of FIG. 8, and lateral aberrations of the imaging lens of Example 3 are shown in FIG. 9.

From the above data, it can be understood that all of the imaging lenses of Examples 1 through 3 satisfy Conditional Formulae (1) through (4), and that all of the imaging lenses of Examples 1 through 3 are high performance imaging lenses with small F numbers, in which the focusing lens groups (the second lens groups G2) are lightweight.

Figure 10:
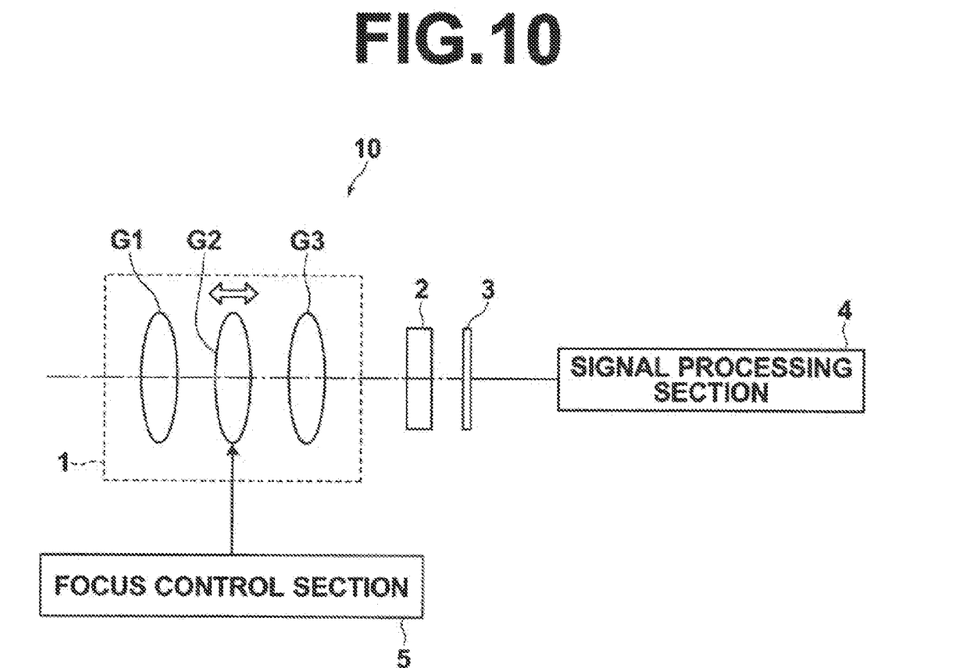
FIG. 10 is a diagram that schematically illustrates the configuration of an imaging apparatus according to an embodiment of the present invention.

Next, an imaging apparatus according to an embodiment of the present invention will be described. FIG. 10 is a diagram that schematically illustrates the configuration of an imaging apparatus that employs a wide angle lens according to an embodiment of the present invention, as an example of an imaging apparatus according to an embodiment of the present invention. Examples of such an imaging apparatus include a video camera and an electronic still camera that employs a solid stats imaging element such as a CCD and a CMOS as a recording medium.

The imaging apparatus 10 illustrated in FIG. 10 is equipped with an imaging lens 1, a filter 2 provided toward the image side of the imaging lens 1, an imaging element 3 that captures images of subjects imaged by the imaging lens, a signal processing section 4 that administers computation processes on signals output from the imaging element 3, and a focus control section 5 that performs focus adjustments of the imaging lens 1.

The imaging lens 1 has a positive first lens group G1 having a positive refractive power and which includes an aperture stop St, a second lens group G2 having a positive refractive power, and a third lens group G3, provided in this order from the object side. The imaging lens 1 is configured to perform focusing operations by moving the second lens group.

FIG. 10 illustrates each of the lens groups in a schematic manner. The imaging element 3 captures images of subjects formed by the imaging lens 1 and converts the images into electrical signals. An imaging surface of the imaging element 3 is positioned to match an image formation plane of the imaging lens. A CCD, a CMOS, or the like may be employed as the imaging element 3.

The present invention has been described with reference to the embodiments and Examples thereof. However, the present invention is not limited to the embodiments and Examples described above, and various modifications are possible. For example, the values of the radii of curvature of each lens component, the distances among surfaces, the refractive indices, the Abbe's numbers, etc., are not limited to the numerical values indicated in connection with the Examples, and may be other values.

What is claimed is:

1. An imaging lens, substantially consisting of:
a first lens group having a positive refractive power which is fixed during focusing operations;
a second lens group having a positive refractive power which moves during focusing operations; and
a third lens group which is fixed during focusing operations, provided in this order from an object side;
the first lens group substantially consisting of a 1a lens group having a positive refractive power, a stop, and a 1b lens group having a positive refractive power, provided in this order from the object side;
the 1a lens group substantially consisting of a positive lens 1a1 with a convex surface having a radius of curvature with a small absolute value toward the object side, a negative meniscus lens 1a2 with a convex surface toward the object side, a negative meniscus lens 1a3 with a convex surface toward the object side, a positive meniscus lens 1a4 with a convex surface toward the object side, a negative lens 1a5 with a concave surface having a radius of curvature with a small absolute value toward an image side, a positive lens 1a6, a negative lens 1a7, and a cemented lens formed by a positive lens 1a8 and a negative lens 1a9, provided in this order from the object side.

2. An imaging lens as defined in claim 1 that satisfies the following conditional formula:

$$0.20 < f/f2 < 0.50 \qquad (1)$$

wherein f is the focal length of the entire system when focused on an object at an infinite distance and f2 is the focal length of the second lens group.

3. An imaging lens as defined in claim 2 that satisfies the following conditional formula:

$$0.25 < f/f2 < 0.40 \qquad (1)'.$$

4. An imaging lens as defined in claim 1, wherein:
the second lens group substantially consists of a positive lens with a convex surface having a radius of curvature with a small absolute value toward the object side.

5. An imaging lens as defined in claim 1, wherein:
the 1b lens group substantially consists of a cemented lens formed by a positive lens 1b1 and a negative lens 1b2.

6. An imaging lens as defined in claim 1, wherein:
the third lens group substantially consists of a negative lens 31 with a surface having a radius of curvature with a small absolute value toward the image side, and a positive lens 32 with a surface having a radius of curvature with a small absolute value toward the object side, provided in this order from the object side.

7. An imaging lens as defined in claim 1 that satisfies the following conditional formulae:

$$80 < \nu 1a8 \quad (2)$$

$$40 < \nu 1a9 < 60 \quad (3)$$

wherein $\nu 1a8$ is the Abbe's number of the positive lens 1a8, and $\nu 1a9$ is the Abbe's number of the negative lens 1a9.

8. An imaging lens as defined in claim 1 that satisfies the following conditional formula:

$$0.20 < D/f < 0.60 \quad (4)$$

wherein D is the distance between the stop and the 1b lens group, and f is the focal length of the entire system when focused on an object at an infinite distance.

9. An imaging lens as defined in claim 8 that satisfies the following conditional formula:

$$0.30 < D/f < 0.50 \quad (4)'$$

10. An imaging apparatus equipped with an imaging lens as defined in claim 1.

* * * * *